United States Patent
El Mghazli et al.

(10) Patent No.: US 9,462,452 B2
(45) Date of Patent: Oct. 4, 2016

(54) SMART CARD INITIAL PERSONALIZATION

(71) Applicant: Alcatel Lucent, Boulogne Billancourt (FR)

(72) Inventors: Yacine El Mghazli, Nozay (FR); Alberto Conte, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 121 days.

(21) Appl. No.: 14/373,948

(22) PCT Filed: Feb. 13, 2013

(86) PCT No.: PCT/EP2013/052879
§ 371 (c)(1),
(2) Date: Jul. 23, 2014

(87) PCT Pub. No.: WO2013/124194
PCT Pub. Date: Aug. 29, 2013

(65) Prior Publication Data
US 2014/0364087 A1  Dec. 11, 2014

(30) Foreign Application Priority Data
Feb. 24, 2012 (EP) .................................... 12305216

(51) Int. Cl.
*H04M 1/66* (2006.01)
*H04M 3/16* (2006.01)
(Continued)

(52) U.S. Cl.
CPC .............. *H04W 8/183* (2013.01); *H04L 63/06* (2013.01); *H04W 12/04* (2013.01); *H04W 12/06* (2013.01); *H04W 8/18* (2013.01)

(58) Field of Classification Search
CPC ... H04W 8/183; H04W 12/06; H04W 12/04; H04W 8/18; H04L 63/06
USPC ........................... 455/411, 432.1, 435.1, 428
See application file for complete search history.

(56) References Cited

U.S. PATENT DOCUMENTS 794,233 A * 7/1905 Kistler ..................... A61J 3/08
  604/288
7,136,632 B1 * 11/2006 Blants ..................... H04L 63/08
  455/418

(Continued)

FOREIGN PATENT DOCUMENTS

| JP | 2010527522 | 8/2010 |
| JP | 2011525311 | 9/2011 |
| WO | 2010015883 | 2/2010 |

OTHER PUBLICATIONS

Oberthur Technologies; Smart HLR; Feb. 1, 2012; pp. 1-4; XP007920644; Retrieved from the Internet: URL:http://www.oberthur.com/download.aspx; [retrieved on May 30, 2012].

*Primary Examiner* — Marceau Milord
(74) *Attorney, Agent, or Firm* — Patti & Malvone Law Group, LLC

(57) ABSTRACT

An exemplary technique is provided for an initial personalization of a smart card coupled with a communication device of a user. The smart card is configured to send a first request to a home location register that authenticates the user by means of a temporary international identity and a temporary authentication key. The smart card is configured to send a second request for smart card personalization to an application server. The smart card is configured to receive a response from the application server that contains a personalization command, an admin code, an initial international identity and an initial authentication key. The smart card is configured to interpret the personalization command to delete the temporary international identity and the temporary authentication key, and to replace them with the initial international identity and the initial authentication key when the admin code is valid.

14 Claims, 2 Drawing Sheets

(51) Int. Cl.
*H04M 1/68* (2006.01)
*H04W 8/18* (2009.01)
*H04W 12/04* (2009.01)
*H04L 29/06* (2006.01)
*H04W 12/06* (2009.01)

(56) References Cited

U.S. PATENT DOCUMENTS

| | | | | |
|---|---|---|---|---|
| 7,266,371 B1 * | 9/2007 | Amin | | H04W 8/18 |
| | | | | 455/418 |
| 8,152,074 B1 * | 4/2012 | de Jong | | G06Q 20/355 |
| | | | | 235/492 |
| 8,225,386 B1 * | 7/2012 | de Jong | | G06Q 20/3552 |
| | | | | 713/184 |
| 8,306,518 B1 * | 11/2012 | Gailloux | | H04L 41/0813 |
| | | | | 379/201.12 |
| 8,385,889 B2 * | 2/2013 | Ishikawa | | H04W 8/24 |
| | | | | 455/410 |
| 8,589,335 B2 * | 11/2013 | Smith | | G06Q 20/341 |
| | | | | 235/380 |
| 8,612,967 B1 * | 12/2013 | Delker | | G06F 8/61 |
| | | | | 717/169 |
| 8,621,201 B2 * | 12/2013 | Costa | | H04L 63/08 |
| | | | | 380/270 |
| 8,706,101 B2 * | 4/2014 | Bouckaert | | H04L 29/12207 |
| | | | | 370/310 |
| 8,789,753 B1 * | 7/2014 | de Jong | | 235/375 |
| 8,929,863 B2 * | 1/2015 | Thorn | | H04W 12/06 |
| | | | | 455/411 |
| 9,064,365 B2 * | 6/2015 | Pluss | | G06Q 20/341 |
| 9,092,775 B2 * | 7/2015 | Bernard | | G06F 8/65 |
| 9,100,803 B2 * | 8/2015 | Rogan | | H04W 8/12 |
| 9,185,089 B2 * | 11/2015 | Khan | | H04L 63/062 |
| 9,203,615 B2 * | 12/2015 | Papillon | | H04W 4/003 |
| 2003/0083068 A1 * | 5/2003 | Wong | | H04L 63/0853 |
| | | | | 455/435.1 |
| 2006/0089124 A1 * | 4/2006 | Frank | | H04L 63/0853 |
| | | | | 455/411 |
| 2009/0191857 A1 * | 7/2009 | Horn | | H04W 4/00 |
| | | | | 455/419 |
| 2010/0190473 A1 | 7/2010 | Ishikawa | | |

\* cited by examiner

SMART CARD INITIAL PERSONALIZATION

FIELD OF THE INVENTION

The present invention relates to a personalization of a smart card via a telecommunication network, more especially to an initial personalization of a smart card with an initial set of credentials.

BACKGROUND

Mobile communications provides access by mobile phones, Personal Digital Assistant PDAs, portable computers and a variety of other user equipment to communicate via radio access networks (RANs) to core networks for connection to other mobile devices, the Internet, and conventional land-line phones. The RANs are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station. Communications between the core network and the base station is encrypted and communications between the base station and the wireless user equipment is also encrypted.

Mobile Networks are using a strong authentication method based on a shared secret configured on the network side in the Authentication Center of the HLR or the HSS, and on the terminal side in the Universal Integrated Circuit Card (UICC) containing a SIM (Subscriber Identity Module) application for a GSM network or a USIM (Universal Subscriber Identity Module) in a UMTS network.

This shared secret is an authentication key called Ki and the action to personalize a generic UICC card it with a given Ki is called personalization.

The authentication key is a 128 bit key used in the authentication and cipher key generation process. The authentication key is used to authenticate the UICC card on the mobile network. Each UICC contains this authentication key which is assigned to it by the operator during the personalization process.

So Mobile Network Operators (MNOs) are physically personalizing the UICC cards in their premises and once for all. Operators then send the personalized UICC card to the user, who will insert it in his mobile terminal to access the mobile network of the MNO. The personalization can also be outsourced to the UICC provider, but it is always configured physically and for ever.

Once the UICC card is personalized, the MNO gives it to the user, who will insert it in his mobile terminal to access the mobile network of the MNO.

This model is not adapted in case of UICC cards that must be embedded in devices before shipping to the final user, or for M2M (Machine to Machine) cases (e.g. consumer electronics, vending machines, car fleets). For those cases, a remote personalization of the UICC card is preferred.

There is need to allow the user to easily perform an initial configuration of the UICC of the device with an initial set of credentials, for any type of device, while having the freedom to choose the initial MNO.

SUMMARY

To remedy the problems referred to hereinabove, a method for an initial personalization of a smart card coupled with a communication device of a user who is not yet a subscriber of any telecommunication network, a temporary international identity and a temporary authentication key being stored in the smart card and in a home location register connected to a roaming entity of a telecommunication network to which the communication device is able to be attached, the method comprising the following steps in the smart card:

sending a first request comprising the temporary international identity to the roaming entity, the first request being forwarded to the home location register that authenticates the user by means of the temporary international identity and the temporary authentication key, the roaming entity allowing the smart card to use resources of the telecommunication network, sending a second request for smart card personalization to an application server connected to the telecommunication network, the application server obtaining an initial international identity and an initial authentication key from said operator, receiving a response from the application server, the response comprising a personalization command, an admin code, the initial international identity and the initial authentication key, interpreting the personalization command to delete the temporary international identity and the temporary authentication key and replace them by the initial international identity and the initial authentication key if the admin code is valid.

The invention advantageously allows a remote reconfiguration of credentials associated with a telecommunication network operator and allows ability to easily launch the subscription to a telecommunication network operator in a very flexible way.

Additionally, the invention advantageously does not require any physical intervention on the device nor to physically connect the device to a wired connection (e.g. Ethernet or USB).

In an embodiment, the roaming entity can extract an identifier of the operator managing the register from the temporary international identity and retrieves the address of the register that is able to authenticate the user before forwarding the first request to the first register, said operator being in a list of allowed operators according to roaming agreement between the operator managing the first register and the operator managing the roaming entity.

In an embodiment, the second request can comprise an identifier of the smart card, and the application server retrieves the admin code that was initially stored in a database in correspondence with an identifier of the smart card corresponding to identifier of the smart comprised in the received second request, before sending the response.

In an embodiment, an application in the smart card checks if the admin code received in the response is compatible with an admin code initially stored in the smart card in order to determine if the admin code is valid.

In an embodiment, the second request and the response are short messages and are exchanged between the smart card and the application server through a switch and a short message center of the telecommunication network.

In an embodiment, the second request and the response contain data packets and are exchanged between the smart card and the application server through the service node and a gateway node of the telecommunication network via a secured session In an embodiment, the second request and the response are exchanged between the smart card and the application server via an access point node restricted and dedicated to the services provided by the application server.

A further object of the invention is a smart card coupled with a communication device of a user who is not yet a subscriber of any telecommunication network, a temporary international identity and a temporary authentication key being stored in the smart card and in a home location register connected to a roaming entity of a telecommunication network to which the communication device is able to be attached, the smart card comprising:

means for sending a first request comprising the temporary international identity to the roaming entity, the first request being forwarded to the home location register that authenticates the user by means of the temporary international identity and the temporary authentication key, the roaming entity allowing the smart card to use resources of the telecommunication network, means for sending a second request or smart card personalization to an application server connected to the telecommunication network, the application server obtaining an initial international identity and an initial authentication key from said operator, means for receiving a response from the application server, the response comprising a personalization command, an admin code, the initial international identity and the initial authentication key, means for interpreting the personalization command to delete the temporary international identity and the temporary authentication key and replace them by the initial international identity and the initial authentication key if the admin code is valid.

A further object of the invention is an application server for an initial personalization of a smart card coupled with a communication device of a user who is not yet a subscriber of any telecommunication network, a temporary international identity and a temporary authentication key being stored in the smart card and in a home location register connected to a roaming entity of a telecommunication network to which the communication device is able to be attached, the application server being connected to the telecommunication network and comprising:

means for receiving a request for smart card personalization from the smart card, after that the smart card has sent another request comprising the temporary international identity to the roaming entity, said another request being forwarded to the home location register that authenticates the user by means of the temporary international identity and the temporary authentication key, and the roaming entity having allowed the smart card to use resources of the telecommunication network, means for obtaining an initial international identity and an initial authentication key from said operator, and means for sending a response to the smart card, the response comprising a personalization command, an admin code, the initial international identity and the initial authentication key, in order that the smart card interprets the personalization command to delete the temporary international identity and the temporary authentication key and replace them by the initial international identity and the initial authentication key if the admin code is valid.

The invention relates further to a home location register for an initial personalization of a smart card coupled with a communication device of a user who is not yet a subscriber of any telecommunication network, a temporary international identity and a temporary authentication key being stored in the smart card and in said home location register connected to a roaming entity of a telecommunication network to which the communication device is able to be attached, the home location register comprising:

means for receiving a first request comprising the temporary international identity from the smart card and forwarded from the roaming entity, means for authenticating the user by means of the temporary international identity and the temporary authentication key, and means for allowing the smart card to use resources of the telecommunication network, in order that the smart card sends a second request for smart card personalization to an application server connected to the telecommunication network, the application server obtaining an initial international identity and an initial authentication key from said operator and sending a response to the smart card, the response comprising a personalization command, an admin code, the initial international identity and the initial authentication key, in order that the smart card interprets the personalization command to delete the temporary international identity and the temporary authentication key and replace them by the initial international identity and the initial authentication key if the admin code is valid.

The invention relates further to a computer program adapted to be executed in a server for performing an initial personalization of a smart card coupled with a communication device, said program including instructions which, when the program is executed in said server, execute the steps of the method of the invention performed in the server.

The invention relates further to a computer program adapted to be executed in a home location register for performing an initial personalization of a smart card coupled with a communication device, said program including instructions which, when the program is executed in said home location register, execute the steps of the method of the invention performed in the home location register.

BRIEF DESCRIPTION OF THE FIGURES

Some embodiments of the present invention are now described, by way of example only, and with reference to the accompanying drawings, in which.

The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
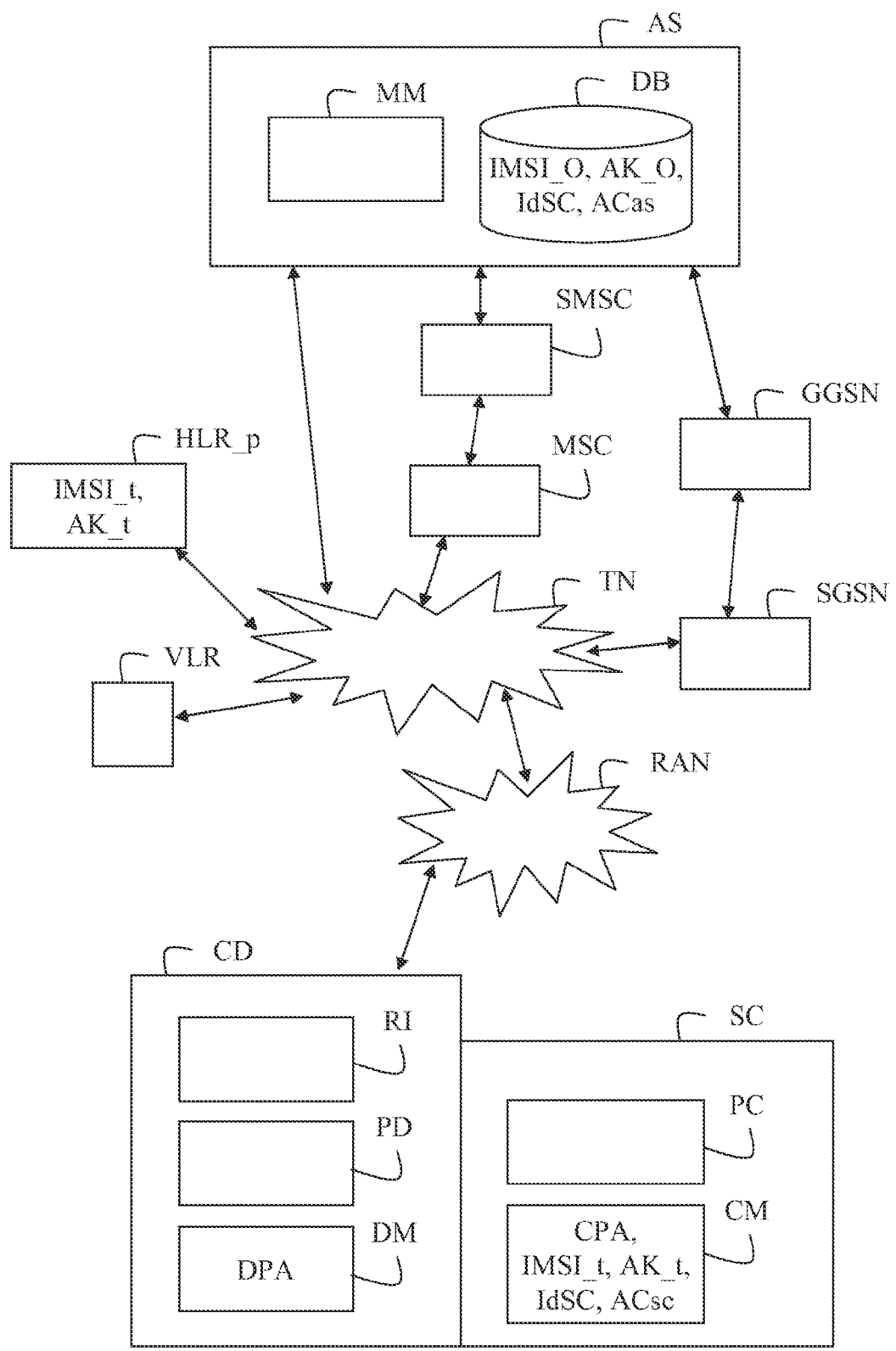
FIG. 1 is a schematic block-diagram of a communication system according to an embodiment of the invention.

Referring to FIG. 1, a communication system comprises an application server AS and a communication device CD which are able to communicate between them through at least a telecommunication network TN.

For example, the telecommunication network TN is a digital cellular radio communication network of the GSM (Global System for Mobile communications) or UMTS (Universal Mobile Telecommunications System) or even CDMA (Code Division Multiple Access) type or even LTE (Long Term Evolution) type. The GSM type network may be coupled with a GPRS (General Packet Radio Service) network for the transmission of data by packets with mobility and access management via radio. For example, the telecommunication network is able to authorize a communication device to send and receive data via the network when the communication device is identified at the network, for example by means of a subscriber identification module associated with the communication device.

FIG. 1 does not represent known main components of the localization area of the telecommunication network where the communication device is situated. The localization area comprises an MSC (Mobile service Switching Center) which is connected by means of a BSC (Base Station Controller) to a base station BTS (Base Transceiver Station) connected by means of a radio link to the communication device.

The communication device CD can establish a connection with the telecommunication network TN through a respective radio access network RAN via a radio link with the base station. The radio access networks are distributed over a geographical area typically divided into cells that are served by a corresponding base station. Base stations communicate over an air interface with the user equipment, with several base stations being connected to a radio network controller (RNC) or base station controller (BSC) that is connected to one or more core networks. In the typical situation, secure communications for users of the system may be provided through encryption and decryption at the base station.

The telecommunication network TN comprises a Home Location Register HLR and one or more Visitor Location Register VLR connected to a switch MSC and/or to a service node SGSN (Serving GPRS Support Node). The register HLR collaborates with an authentication center (AuC) that manages a database containing in particular a set of international identities IMSI (International Mobile Subscriber Identity) and a set of authentication keys each associated with a subscription profile for each user of the network and the number of the register VLR to which the communication device is temporarily connected. The register VLR is a relay of the register HLR and contains characteristics of the users located in the localization area to manage their mobility.

The radio access network RAN is connected to a service node SGSN and a gateway-node GGSN (Gateway GPRS Support Node) supporting a packet-switched core network of the telecommunication network TN and is connected to a switch MSC supporting a circuit-switched core network of the telecommunication network TN. All of the SGSN and GGSN nodes constitute a gateway connecting the radio access network and the packet core network. According to the invention, the application server AS may be directly or indirectly accessible from the gateway node GGSN via a packet communication network, for example the Internet, and also from the switch MSC via a Short Message Service Center SMSC.

A roaming entity of the telecommunication network manages a database containing in particular a set of temporary international identities IMSI_t, used to identify users which are attached the operator managing the application server and for which roaming agreements have been settled between the operator managing the application server and the operator managing the telecommunication network TN. As examples, a roaming entity can be a switch MSC, a node SGSN or even a register HLR.

The communication device CD can be a radio communication mobile terminal. For example, the communication device CD is a mobile phone, or is a communicating Personal Digital Assistant PDA, or an intelligent telephone like SmartPhone.

In an example, the communication device CD is a cellular mobile radio communication terminal, connected by a channel to a radio access network of the telecommunication network TN.

By way of example, the communication device CD may be a motor vehicle belonging to a taxi company, or an automatic counter of a particular energy, such as water, gas, or electricity belonging to a company in the energy sector, or a beverage vending machine belonging to a company specializing in food vending. The communication device CD is therefore a fixed or mobile device that contains a UICC card and can communicate with the telecommunication network by means of the UICC card.

In other examples, the communication device CD can be replaced by any device which is equipped with a smart card reader and can communicate with the smart card.

In one embodiment, it is considered that the communication device CD is owned by a user who is not yet a subscriber of any telecommunication network and who wishes to become a subscriber of a telecommunication network.

In all cases, it is considered that the communication device and the smart card are owned by a user. For example, the user can be a physical person or an individual in case the communication device is a mobile terminal or a SmartPhone, and the user can be a moral person or a legal entity in case the communication device is a machine like a motor vehicle or an automatic counter.

The communication device CD is associated with a smart card SC, for example included in the communication device CD.

The communication device CD comprises a radio interface RI, a processor PD, device memories MD and a smart card reader. The memories MD comprise various memories such as ROM memory, a nonvolatile memory EEPROM or Flash and a RAM memory.

The radio interface RI transposes in frequency, converts digitally, demodulates and decodes messages received via the telecommunication network TN, and inversely transmits messages.

The device memories MD comprise the operating system of the communication device CD and an execution environment such as a Java virtual machine JVMT programmed in Java, for example J2ME.

In particular, in the nonvolatile memory of device memories MD are implemented device applications, originally written in a high level language of type object-oriented such as language Java Virtual compatible with virtual machine JVMT. The virtual machine JVMT can communicate with a virtual machine JVMC installed in the smart card SC via a predetermined communication protocol, like protocol APDU.

In order that device applications respectively communicate with card applications implemented in the smart card SC in accordance with predetermined communication protocol, an access interface to access resources and data in the smart card is implemented in the device memories DM for example under the form of a Java API (Application Programming Interface).

Device memories DM further include a communication interface, for example the SIM Toolkit engine, so that a main application SIM or USIM or any other application in the smart card communicates with the "outside world" via the communication device, for example with an application server. The communication interface manages commands and responses exchanged between the "outside world" and the main application SIM or USIM, for example by adapting them to short messages exchanged with a short message server.

The smart card SC, also known as microcontroller card or integrated circuit card, is a user identity module of UICC type associated with the communication device.

In one embodiment, a microcontroller in the smart card SC mainly comprises one or more processors PC, and card memories CM. The smart card exchange commands, or requests, and replies with the communication device CD via a input/output port of and the smart card reader of the communication device CD with or without contact. The various components of the smart card may be interconnected by a bidirectional bus.

Card memories CM comprise memory of type Flash or ROM including codes and data for example of an operating system and a virtual machine JVMC compliant with the Java Card specification, or any other operating system.

Card memories CM comprise also memory of type Flash or EEPROM for storing for example identity numbers and other parameters of the profile of the user possessing the card, such as a PIN code, a temporary international identity IMSI_t, a temporary authentication key AK_t, an identifier IdSC of the smart card, an admin code ACsc, and other security data.

Card memories CM comprise also memory of type RAM serving more particularly to data processing.

Card memories CM comprise also a memory space to store card applications which are proprietary code or applets STK, e.g. SIM ToolKit, and that are installed during the manufacture of the smart card or possibly installed during use of the card at the request of the user or the operator.

In particular, a card personalization application CPA is stored in the card memories CM and has a read/write access especially to the memory space containing the temporary international identity IMSI_t and the temporary authentication key AK_t, for example under an OTA command presenting the admin code. The card personalization application CPA is able to handle commands and messages according to an over-the-air (OTA) mechanism and is able to communicate with a corresponding device personalization application DPA stored in the device memories DM of the communication device CD.

The application server AS is a server included in a network connected to at least the telecommunication network TN, but is not managed by any operator of these telecommunication networks, acting as an independent service entity.

The application server AS is managed by an operator acting as a mobile virtual network operator (MVNO) dedicated to provide mobile access for management of UICC smart card only and does not provide any telecom service.

The application server AS is a platform that is accessible from the communication device CD through at least the telecommunication network TN and other telecommunication networks with which roaming agreements have been settled. The application server AS is able to communicate with the switch MSC, the service node SGSN and a gateway-node GGSN of the telecommunication network TN via a secured session for example of IPsec (Internet Protocol Security) type.

The application server AS comprises a messaging module MM handling exchange of messages with the communication device CD, for example in the form of short message through a short message center, and handling exchange of messages with entities of the telecommunication network TN, such as a switch MSC and a node GGSN.

The application server AS manages a database DB wherein admin codes ACas are stored in correspondence with identifiers IdSC of smart cards. An admin code corresponds to a secret shared between the application server AS and a smart card SC, and is unique for each smart card SC. It is considered that an admin code allows a command provided through an OTA mechanism to obtain read/write access to the space memory of the smart card SC where the international identity IMSI and the authentication key AK are stored.

The operator managing the application server AS manages also a Home Location Register HLR_p dedicated to the authentication of users that are not yet subscriber of any telecommunication network. For that, the register HLR_p manages a database containing in particular a set of temporary international identities IMSI_t and a set of temporary authentication key AK_t.

The register HLR_p is connected to at least the telecommunication network TN and other telecommunication networks with which roaming agreements have been settled.

The operator managing the application server AS manages also a Short Message Service Center SMSC able to handle exchanges of messages between the application server and a center SMSC of the telecommunication network TN.

Figure 2:
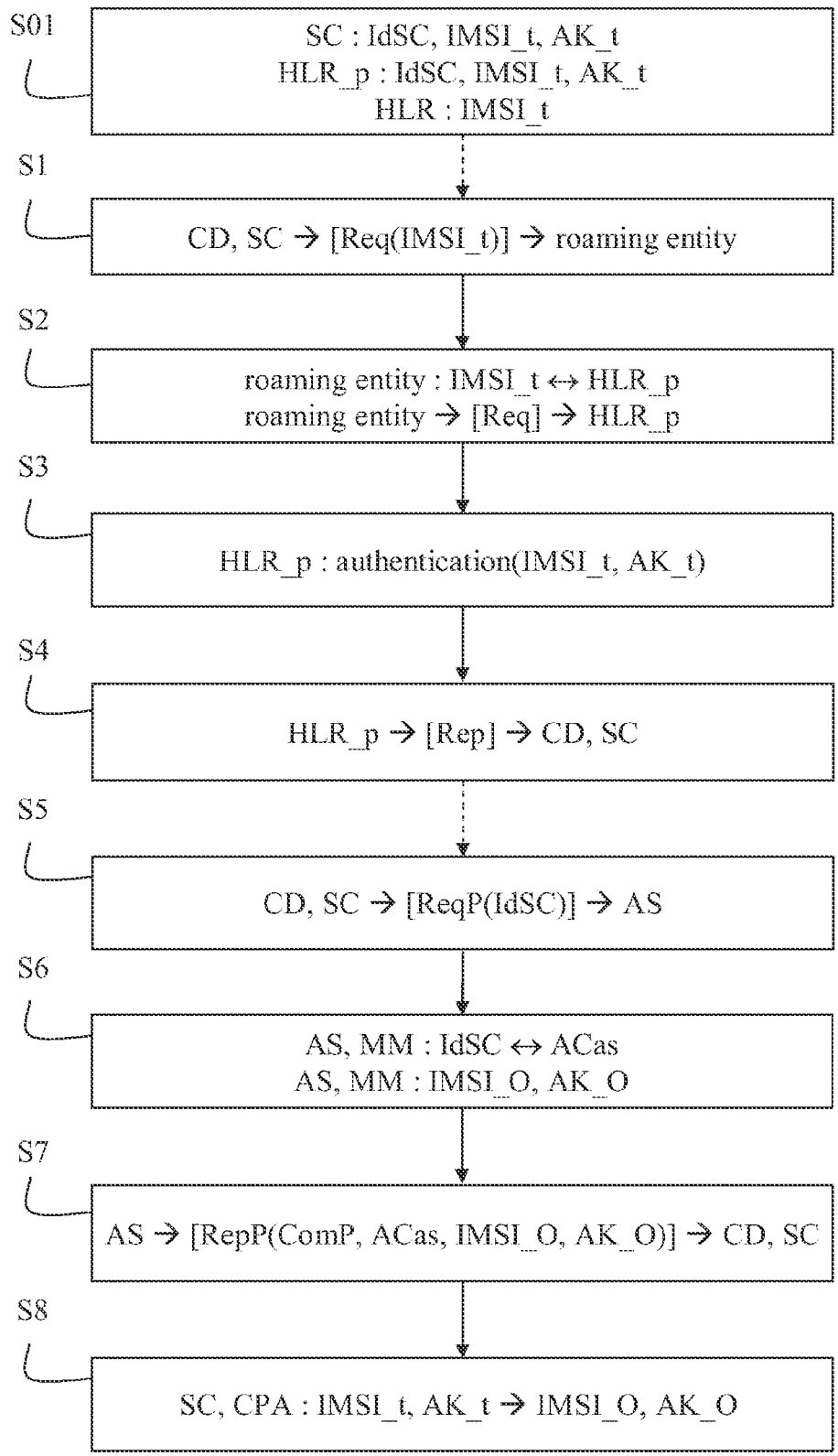
FIG. 2 is a flowchart showing steps performed to execute a method for an initial personalization of a smart card coupled with a communication device in a telecommunication network according to an embodiment of the invention.

With reference to FIG. 2, a method for initial personalization of a smart card coupled with a communication device according to one embodiment of the invention comprises steps S1 to S8 executed automatically within the communication system.

In the example embodiment, it is considered a user that owns a smart card SC coupled with a communication device CD, is not a subscriber of the telecommunication network TN and wishes to become a subscriber of a telecommunication network, for example the telecommunication network TN or another telecommunication network. The method is described hereinafter with reference to a telecommunication network TN, but can be extended to any telecommunication network with which the operator managing the application server has settled roaming agreement.

At an initial step S01, the application server AS communicates with the operator of the telecommunication network TN, in order to make agreement for roaming allowing users to use the network resources, transmitting a set of temporary international identities IMSI_t from the register HLR_p to the roaming entity of the telecommunication network TN, such as a switch MSC or a node SGSN.

The application server AS also stores in the database DB the admin codes ACas respectively associated with identifier IdSC of smart cards SC of users who are not yet subscribers of any telecommunication network. The admin codes ACas may be obtained from the smart card manufacturer, before the smart cards are provided to the users.

Before a smart card is provided to the user, the operator managing the application server configures the smart card by creating a temporary international identity IMSI_t and a temporary authentication key AK_t. This configuration of the smart card could be also outsourced to the smart card manufacturer. The created temporary international identity and temporary authentication key are stored in the register HLR_p in correspondence with the identifier of the smart card.

Finally, the temporary international identity IMSI_t, the temporary authentication key AK_t, and the identifier IdSC of the smart card are stored in the card memories CM of the smart card SC in the one hand, and are stored in the register HLR_p on the other hand. Also the temporary international identity IMSI_t is stored in the roaming entity.

At step S1, the user solicits a request to the operator of the telecommunication network TN in order to become a subscriber of an operator of a telecommunication network. For example, the user selects a command in a menu displayed in the communication device by the device personalization application DPA or enters a code of command read from a document of the operator.

The smart card SC sends a request Req comprising the temporary international identity IMSI_t to the telecommunication network TN. The request Req is of "IMSI-attach" type and is received and handled by the roaming entity.

At step S2, the roaming entity extracts the identifier of the operator managing the register HLR_p from the temporary international identity IMSI_t and retrieves the address of the register HLR_p that is able to authenticate the user.

The roaming entity determines that this operator is in a list of allowed operators according to roaming agreement and the "IMSI-attach" request to the register HLR_p.

The roaming entity forwards the request Req to the register HLR_p.

At step S3, the register HLR_p receives the request Req and authenticates the user, using the temporary international identity IMSI_t received in the request and the temporary international identity IMSI_t and the temporary authentication key AK_t that are stored in the database.

At step S4, the register HLR_p informs roaming entity of the telecommunication network TN that the authentication of the user is a success and sends a response Rep back the communication device CD through the telecommunication network TN. The response Rep comprises an indication that authentication is successful.

As the user is authenticated, the user is allowed to use resources of the telecommunication network TN for some kind of communications according to the roaming agreement. It is assumed that the register HLR_p collaborates with the roaming entity to allow the smart card to use resources of the telecommunication network.

In particular, the roaming entity enables connectivity to the circuit-switched core network and the packet-switched core network of the telecommunication network TN for the communication device CD. In case the user is allowed to use the packet-switched core network, the node SGSN acting a the roaming entity creates a PDP (Packet Data Network) context to exchange data with the communication device CD. A PDP context is a set of information describing a multimedia service and comprising parameters for communicating with a service server, using a specific protocol, such as the IP or X.25 protocol, and with a determined quality of service. An activation procedure called "PDP Context Activation" enables the communication device CD to be known to the node-gateway GGSN which connects the radio access network RAN serving the communication device CD with the packet-switched core network of the telecommunication network TN connected to the application server AS. At this end, the roaming agreement can define an access point name (APN) dedicated to the services provided by the application server AS, allowing the user to use internet connection of the telecommunication network only for the personalization service.

At step S5, the smart card SC is now able to connect to the application server AS by means of an identifier IdPS of personalization service, initially stored in the smart card SC.

In an embodiment where the communication device is a mobile terminal or the like owned by an individual, the user is ready to choose an operator of telecommunication network, called selected operator. For example, the user selects a command in a menu displayed in the communication device by the device personalization application DPA or enters a code of command read from a document of the selected operator.

In another embodiment communication where the communication device can be a mobile terminal or the like owned by an individual or a machine, the smart card SC launches itself the personalization procedure as soon as authentication is confirmed.

The card personalization application CPA of the smart card SC sends a request ReqP to the application server AS through the roaming entity of the telecommunication network TN in order to perform initial personalization of the smart card SC. The request ReqP comprises the identifier IdSC of the smart card SC and optionally an identifier IdO of the selected operator if the user has selected it.

The nature of the roaming entity receiving the request ReqP depends on the identifier IdPS of personalization service.

The identifier IdPS of personalization service can be a number at which the application server can be reached via a SMS message or can be an address at which the application server can be reached via an internet connection. The identifier IdPS of personalization service can be an APN address restricted and dedicated to the services provided by the application server AS.

In one embodiment, the request ReqP is in the form of a short message which is handled by a switch MSC and a short message center SMSC that transforms the message into data packets and sends the data packets through the telecommunication network TN to the application server AS through another short message center SMSC handle by the operator managing the application server. In an example, the identifier IdPS of personalization service is a number at which the application server can be reached via a SMS message and the request ReqP is directly sent toward the application server. In another example, the identifier IdPS of personalization service is an indicator informing the operator managing the telecommunication network that the request is about a subscription change and the request ReqP includes this indicator is sent toward a center SMSC of the telecommunication network that forwards it to the application server.

In another embodiment, the transmission of the request ReqP triggers a procedure of type "GPRS Attach" which makes it possible to establish a logic link between the communication device CD and the node SGSN and to activate a PDP context to send and receive data from the communication device CD. In this case, the request Req contains data packets and is transmitted through the SGSN and GGSN nodes via a secured session for example of IPsec (Internet Protocol Security) type. In an embodiment, the request ReqP is sent toward an APN restricted and dedicated to the services provided by the application server AS, the smart card using the identifier IdPS of personalization service that describes the address of the APN.

At step S6, the messaging module MM of the application server AS receives the request ReqP and retrieves the identifier IdSC of the smart card stored in the database DB corresponding to identifier IdSC of the smart comprised in the request ReqP. The messaging module MM of the application server AS retrieves then the admin code ACas stored in correspondence with the identifier IdSC of the smart card in the database.

The messaging module MM of the application server AS obtains an initial international identity IMSI_O and an initial authentication key AK_O from the selected operator. These identity and key can be beforehand provided by the selected operator and stored in the database DB or provided on demand by the selected operator. In another example, the request ReqP contains an identifier IdO of the operator selected by the user and the application server AS identifies the selected operator with the received identifier IdO.

At step S7, the messaging module MM of the application server AS sends a response RepP comprising a personalization command ComP, the admin code ACas, the initial international identity IMSI_O and the initial authentication key AK_O to the communication device CD. The response RepP is sent from the application server AS across the telecommunication network TN to the smart card SC via the communication interface of the communication device CD.

In one embodiment, the response RepP is transformed by a short message center SMSC of the telecommunication network TN into a short message that is encrypted. The received response RepP is decrypted by the smart card and the content of the message is temporarily stored in the card memories CM of the smart card to be executed by the card personalization application CPA.

In another embodiment, the response RepP contains data packets and is transmitted through the SGSN and GGSN nodes via a secured session for example of IPsec (Internet Protocol Security) type.

It will be understood that the response RepP can be decomposed in several messages, especially in the case where the response RepP is in form of a short message.

At step S8, the card personalization application CPA interprets the personalization command ComP to execute the personalization of the smart card SC. The card personalization application CPA checks if the admin code ACas is valid, that is to say if the admin code ACas received in the response ResP is compatible with the admin code ACsc initially stored in the smart card. In one example, the admin code ACas received in the response ResP has to be the same as the admin code ACsc initially stored in the smart card. More generally, the admin codes may be tools used for authentication and ciphering procedures in case the response ResP is decomposed in many messages.

If the admin code ACas is valid, the card personalization application CPA deletes the temporary identity IMSI_t and the temporary authentication key AK_t initially stored in the card memories CM of the smart card SC, and replace them by the received initial international identity IMSI_O and initial authentication key AK_O.

Optionally, the temporary identity IMSI_t and the temporary authentication key AK_t initially stored in the card memories CM are not deleted but kept in another memory space of the smart card and set as inactive.

Optionally, the card personalization application CPA can activate the device personalization application DPA in order to ask an acknowledgement of the user for the card personalization. For example, the device personalization application DPA displays a question like the following: "Are you sure to become subscriber of this selected operator?".

Then communication device CD can launch a connection request to be attached to the selected telecommunication network. The selected operator is aware of the success of the personalization of the smart card, for example after a successful authentication of the communication device CD, and informs the application server AS in order that this latter can remove references to the user, for example by deleting the admin code ACas stored in correspondence with the identifier IdSC of the smart card.

The invention described here relates to a method and a server for an initial personalization of a smart card coupled with a communication device. In an embodiment, the steps of the method of the invention are determined by the instructions of a computer program incorporated in a server such as the application server AS according to the invention. The program includes program instructions which, when said program is executed in a processor of the server the operation whereof is then controlled by the execution of the program, execute the steps of the method according to the invention.

As a consequence, the invention applies also to a computer program, in particular a computer program on or in an information medium readable by a data processing device, adapted to implement the invention. That program may use any programming language and be in the form of source code, object code or an intermediate code between source code and object code, such as a partially compiled form, or in any other desirable form for implementing the method according to the invention.

The information medium may be any entity or device capable of storing the program. For example, the medium may include storage means or a recording medium on which the computer program according to the invention is recorded, such as a ROM, for example a CD ROM or a microelectronic circuit ROM, or a USB key, or magnetic recording means, for example a diskette (floppy disk) or a hard disk.

The invention claimed is:

1. A method for an initial personalization of a smart card coupled with a communication device of a user who is not yet a subscriber of any telecommunication network, a temporary international identity and a temporary authentication key being stored in the smart card and in a home location register connected to a roaming entity of a telecommunication network to which the communication device is able to be attached, the method comprising the following steps in the smart card: sending, at the smart card, a first request comprising the temporary international identity to the roaming entity, the first request being forwarded to the home location register that authenticates the user by means of the temporary international identity and the temporary authentication key; sending, at the smart card, a second request for smart card personalization to an application server connected to the telecommunication network, wherein the second request contains an identifier of a selected operator and an identifier of the smart card; receiving, at the smart card, a response from the application server, the response comprising a personalization command, an admin code, an initial international identity and an initial authentication key; and interpreting, at the smart card, the personalization command to delete the temporary international identity and the temporary authentication key and to replace them with the initial international identity and the initial authentication key when the admin code is valid.

2. The method according to claim 1, wherein the roaming entity extracts an identifier of the operator managing the register from the temporary international identity and retrieves the address of the register that is able to authenticate the user before forwarding the request to the first register.

3. The method according to claim 1, wherein the application server retrieves the admin code that was initially stored in a database in correspondence with an identifier of the smart card corresponding to the identifier of the smart card comprised in the received second request, before sending the response.

4. The method according to claim 1, wherein the smart card comprises an application, and wherein the application determines whether the admin code received in the response is compatible with another admin code initially stored in the smart card to determine whether the admin code is valid.

5. The method according to claim 1, wherein the second request and the response are short messages and are exchanged between the smart card and the application server through a switch and a short message center of the telecommunication network.

6. The method according to claim 1, wherein the second request and the response contain data packets and are exchanged between the smart card and the application server through a service node and a gateway node of the telecommunication network via a secured session.

7. The method according to claim 6, wherein the second request and the response are exchanged between the smart card and the application server via an access point node restricted and dedicated to services provided by the application server.

8. The method according to claim 1, wherein the roaming entity comprises a mobile switching center (MSC) or a Serving GPRS Support Node (SGSN).

9. The method according to claim 1, wherein the communication device comprises a mobile phone, a Personal Digital Assistant (PDA), a smart phone, or an automatic counter of water, gas, or electricity belonging to a company in the energy sector.

10. A smart card coupled with a communication device of a user who is not yet a subscriber of any telecommunication network, a temporary international identity and a temporary authentication key being stored in the smart card and in a home location register connected to a roaming entity of a telecommunication network to which the communication device is able to be attached, the smart card comprising: means for sending, at the smart card, a first request comprising the temporary international identity to the roaming entity, the first request being forwarded to the home location register that authenticates the user by means of the temporary international identity and the temporary authentication key; means for sending, at the smart card, a second request for smart card personalization to an application server connected to the telecommunication network, wherein the second request contains an identifier of a selected operator and an identifier of the smart card; means for receiving, at the smart card, a response from the application server, the response comprising a personalization command, an admin code, an initial international identity and an initial authentication key; and means for interpreting, at the smart card, the personalization command to delete the temporary international identity and the temporary authentication key and to replace them with the initial international identity and the initial authentication key when the admin code is valid.

11. An application server for an initial personalization of a smart card coupled with a communication device of a user who is not yet a subscriber of any telecommunication network, a temporary international identity and a temporary authentication key being stored in the smart card and in a home location register connected to a roaming entity of a telecommunication network to which the communication device is able to be attached, the application server being connected to the telecommunication network and comprising: means for receiving, at the application server, a request for smart card personalization from the smart card that contains an identifier of a selected operator and an identifier of the smart card; means for obtaining, at the application server, an initial international identity and an initial authentication key from said selected operator; and means for sending, at the application server, a response to the smart card, the response comprising a personalization command, an admin code, the initial international identity and the initial authentication key, to enable the smart card to interpret the personalization command to delete the temporary international identity and the temporary authentication key and to replace them with the initial international identity and the initial authentication key when the admin code is valid.

12. A home location register for an initial personalization of a smart card coupled with a communication device of a user who is not yet a subscriber of any telecommunication network, a temporary international identity and a temporary authentication key being stored in the smart card and in said home location register connected to a roaming entity of a telecommunication network to which the communication device is able to be attached, the home location register comprising: means for receiving a first request comprising the temporary international identity from the smart card; means for authenticating the user by means of the temporary international identity and the temporary authentication key; and means for allowing the smart card to use resources of the telecommunication network to enable the smart card to send a second request for smart card personalization to an application server connected to the telecommunication network, wherein the second request contains an identifier of a selected operator and an identifier of the smart card, the application server being configured to obtain an initial international identity and an initial authentication key from said selected operator and to send a response to the smart card, the response comprising a personalization command, an admin code, the initial international identity and the initial authentication key, to enable the smart card to interpret the personalization command to delete the temporary international identity and the temporary authentication key and to replace them with the initial international identity and the initial authentication key when the admin code is valid.

13. A non-transitory information medium storing computer executable instructions for performing steps to be executed in an application server for an initial personalization of a smart card coupled with a communication device of a user who is not yet a subscriber of any telecommunication network, a temporary international identity and a temporary authentication key being stored in the smart card and in a home location register connected to a roaming entity of a telecommunication network to which the communication device is able to be attached, the application server being connected to the telecommunication network, said instructions comprising: receiving, at the application server, a request for smart card personalization from the smart card, wherein the request contains an identifier of a selected operator and an identifier of the smart card; obtaining, at the application server, an initial international identity and an initial authentication key from said selected operator; and sending, at the application server, a response to the smart card, the response comprising a personalization command, an admin code, the initial international identity and the initial authentication key, to enable the smart card to interpret the personalization command to delete the temporary international identity and the temporary authentication key and to replace them with the initial international identity and the initial authentication key when the admin code is valid.

14. A non-transitory information medium storing computer executable instructions for performing steps to be executed in a home location register for an initial personalization of a smart card coupled with a communication device of a user who is not yet a subscriber of any telecommunication network, a temporary international identity and a temporary authentication key being stored in the smart card and in said home location register connected to a roaming entity of a telecommunication network to which the communication device is able to be attached, said instructions comprising: receiving a first request comprising the temporary international identity from the smart card; authenticating the user by means of the temporary international identity and the temporary authentication key; and allowing the smart card to use resources of the telecommunication network to enable the smart card to send a second request for smart card personalization to an application server connected to the telecommunication network, wherein the second request contains an identifier of a selected operator and an identifier of the smart card, the application server being configured to obtain an initial international identity and an initial authentication key from said selected operator and to send a response to the smart card, the response comprising a personalization command, an admin code, the initial international identity and the initial authentication key, to enable the smart card to interpret the personalization command to delete the temporary international identity and the temporary authentication key and to replace them with the initial international identity and the initial authentication key when the admin code is valid.

* * * * *